United States Patent
Mederer et al.

(10) Patent No.: US 12,286,088 B2
(45) Date of Patent: Apr. 29, 2025

(54) CONTROLLING METHOD OF A DECELERATION SYSTEM OF A VEHICLE

(71) Applicant: KNORR-BREMSE Systeme fuer Nutzfahrzeuge GmbH, Munich (DE)

(72) Inventors: Martin Mederer, Neumarkt (DE); Fernando Venegas Diaz, Munich (DE); Tamas Streli, Munich (DE); Aron Kutas, Izsak (HU); Tamas Dohany, Pecs (HU)

( * ) Notice: Subject to any disclaimer, the term of this patent is extended or adjusted under 35 U.S.C. 154(b) by 117 days.

(21) Appl. No.: 18/085,913

(22) Filed: Dec. 21, 2022

(65) Prior Publication Data

US 2024/0208471 A1 Jun. 27, 2024

(51) Int. Cl.
| B60T 8/1761 | (2006.01) |
| B60T 8/172  | (2006.01) |
| B60T 13/68  | (2006.01) |

(52) U.S. Cl.
CPC .......... B60T 8/17616 (2013.01); B60T 8/172 (2013.01); B60T 13/686 (2013.01); *B60T 2220/04* (2013.01); *B60T 2270/88* (2013.01)

(58) Field of Classification Search
CPC .... B60T 8/17616; B60T 8/172; B60T 13/686; B60T 2220/04; B60T 2270/88
See application file for complete search history.

(56) References Cited

U.S. PATENT DOCUMENTS

| 7,441,845 B2 * | 10/2008 | Crombez | B60W 30/18127 303/152 |
| 9,327,731 B2 * | 5/2016 | Keeney | B60T 1/10 |
| 10,029,664 B2 * | 7/2018 | Wolff | B60T 13/586 |
| 10,730,393 B2 * | 8/2020 | Crombez | F16D 61/00 |
| 11,872,977 B2 * | 1/2024 | Adler | B60T 13/662 |
| 12,122,375 B2 * | 10/2024 | Trofimov | B60L 15/2009 |
| 2007/0107958 A1 * | 5/2007 | Oliver | B60L 7/26 903/947 |
| 2009/0139788 A1 * | 6/2009 | Miller | B60W 10/08 180/165 |
| 2010/0125398 A1 * | 5/2010 | Headlee | B60T 13/586 180/65.265 |
| 2010/0151989 A1 * | 6/2010 | Read | B60W 20/14 477/4 |
| 2010/0219681 A1 * | 9/2010 | Rini | B60W 20/13 180/165 |
| 2020/0198607 A1 * | 6/2020 | Weitze | B60T 8/4081 |
| 2021/0129831 A1 * | 5/2021 | Hecker | B60W 10/184 |
| 2023/0271595 A1 * | 8/2023 | Buchanan | B60T 7/20 303/138 |

* cited by examiner

Primary Examiner — Carl C Staubach
(74) Attorney, Agent, or Firm — Crowell & Moring LLP

(57) ABSTRACT

A method for controlling a deceleration system of a vehicle is disclosed, wherein the deceleration system includes a pressure operated brake system that is a first deceleration subsystem of the deceleration system. The method activates a second deceleration subsystem of the deceleration system for applying a current deceleration effect to the vehicle; generates an activation pressure for activating the brake system, and blocks the generated activation pressure to keep the brake system deactivated. The activation pressure is released and supplied to the pressure operated brake system for activation if the current deceleration effect applied to the vehicle by the second deceleration subsystem is lower than a predetermined deceleration threshold.

16 Claims, 5 Drawing Sheets

CONTROLLING METHOD OF A DECELERATION SYSTEM OF A VEHICLE

BACKGROUND AND SUMMARY

The present invention relates to a method for controlling a deceleration system of a vehicle, a deceleration system for a vehicle, and a vehicle.

Commercial vehicles with pressure operated brake systems (first deceleration subsystem) are more and more equipped with electric machines. The electric machine acts as a second deceleration subsystem of the vehicle, wherein braking by the electric machine is preferred since thereby a wear-free braking operation and recovering of electric energy is possible. However, braking by the second deceleration subsystem does not achieve the required deceleration effect in every operation case. Therefore, the pressure operated brake system must be activated at least additionally.

It is therefore an object of the present invention, to realize a combined operation of a pressure operated brake system with a further deceleration system.

This object is achieved by the subject-matter of the independent claims. Advantageous embodiments are subject-matters of the dependent claims.

According to the invention, a method for controlling a deceleration system of a vehicle is provided, wherein the deceleration system comprises a pressure operated brake system that is a first deceleration subsystem of the deceleration system. The method comprises the following steps:

activating a second deceleration subsystem of the deceleration system for applying a current deceleration effect to the vehicle;

generating an activation pressure for activating the brake system;

blocking the generated activation pressure to keep the brake system deactivated, wherein the activation pressure is released and supplied to the pressure operated brake system for activation if the current deceleration effect applied to the vehicle by the second deceleration subsystem is lower than a predetermined deceleration threshold.

The step of activating the second deceleration subsystem and the step of generating the activation pressure may be carried out in the order described above. However, it is also possible that both steps are carried out simultaneously or that the step of generating the activation pressure is carried out before step of activating the second deceleration subsystem.

The blocking of the activation pressure has the effect that the pressure is already generated but it is still held back. Therefore, if the pressure operated brake system shall be activated, the activation pressure only has to be released and supplied to the brake system and a generating of the activation pressure does not have to be carried out to this point of time.

In the context of this invention, the generating of the activation pressure may comprise an opening of a brake valve according to a brake pedal position that is set by a driver. That is, the activation pressure may be solely generated by mechanically opening a brake valve that may be a part of the brake pedal or a separate part. The brake pedal and/or the brake valve may be a part of a deceleration demand source as described later.

This method allows the primary use of the second deceleration subsystem, wherein the pressure operated brake system may be used supplementarily if the braking effect of the second deceleration subsystem is not sufficient in the current braking operation.

The first deceleration subsystem, i.e. the pressure operated brake system, may comprise a friction brake system. In particular, the pressure operated brake system is a pneumatic or hydraulic brake system. Typically, the first deceleration subsystem wears out more compared to the second deceleration subsystem. Therefore, primary use of the second deceleration subsystem is preferred. According to a preferred aspect, the pressure operated brake system is an ABS-based brake system equipped with stability functions.

The second deceleration subsystem may comprise an electric machine. The electric machine may be used for driving the vehicle and for recuperating electric energy by decelerating the vehicle. However, when decelerating the vehicle by the second decelerating subsystem, the brake effect on the vehicle may not be sufficient due to a limited amount of energy that may be recovered in an electric energy storage of the vehicle or by a limited brake torque that the electric machine generates. Further, a limitation of the braking effect may be given by a stability request of the vehicle, wherein braking by using the electric machine via the driven axles must not lead to an instable driving state of the vehicle like excessive oversteering or understeering. Primary use of the second deceleration subsystem may lead to a maximization of energy recuperation, since at the beginning of the breaking event, there is the highest kinetic energy potential to recover.

Additionally or alternatively, the second deceleration subsystem may comprise other systems for decelerating the vehicle, like an electric or hydraulic endurance brake or a retarder.

Advantageously, when the vehicle decelerates by the second deceleration subsystem, releasing of the activation pressure and thereby activating the pressure operated brake system allows a blending operation of the pressure operated brake system and of the second deceleration subsystem. During blending operation, the vehicle is decelerated by both systems. If the second deceleration subsystem comprises an electric machine that is activated in generator mode for energy recuperation, the blending may be realized that the maximum achievable amount of electric energy is recuperated and the pressure operated brake system is only used additionally if the deceleration effect of the second deceleration subsystem is not sufficient. Advantageously, this allows that the maximum achievable amount of electric energy is recuperated and the amount of energy absorbed by the pressure operated brake system is reduced.

Advantageously, by generating the activation pressure for activating the pressure operated brake system, the activation time is reduced compared to a method or deceleration system where the pressure is only generated when the pressure operated brake system shall be used for decelerating the vehicle, i.e. for activating the pressure operated brake system.

Preferably, the pressure operated brake system (first deceleration subsystem) is controlled by partially or fully releasing the activation pressure. In this case, the blending can be realized in a smooth way, since partial releasing may lead to an activation of the pressure operated brake system just to assist the second deceleration subsystem and to achieve the predetermined deceleration threshold without braking too much by the pressure operated brake system.

In particular, several ways for blocking the activation pressure are possible. In the following, preferred ones are described.

Preferably, the activation pressure is a brake pressure for activating a brake actuator of the brake system, wherein blocking of the activation pressure is realized by a pressure control valve configured to control a brake pressure supplied to the brake actuator or by a separate blocking valve. The pressure control valve is preferably configured to control the intensity of the contact force between the brake disc and the brake pads or between the brake drum and the brake shoes. That is, the pressure control valve is configured to supply pressure to the brake actuator, to release pressure from the brake actuator or to hold the pressure in the brake actuator. Preferably, the pressure control valve is controlled depending on the wheel slip of the vehicle and used for realising an ABS-braking functionality. If the blocking is realized by a separate blocking valve, the controlling of the pressure control valve may be focused on the ABS-braking functionality. If the blocking is realized by the pressure control valve itself, the brake system is kept simpler. The pressure control valve is preferably configured as a solenoid valve.

Alternatively, the activation pressure is a control pressure for a relay valve of the brake system, wherein the relay valve is configured to supply a brake pressure to a brake actuator of the brake system according to the activation pressure, wherein blocking of the activation pressure is realized by the relay valve of the brake system or by a separate blocking valve. The brake actuator of the brake system is preferably a friction based brake actuator like a disc or drum brake. The brake pressure supplied from the relay valve to the brake actuator is preferably the pressure causing a contact force between the brake disc and the brake pads or between the brake drum and the brake shoes. Blocking of the activation pressure in this configuration, causes inactivity of the relay valve at least at its output to the brake actuator. If the blocking is realized by a separate blocking valve, the relay valve may be kept simple in construction. If the blocking is realized by the relay valve itself, it may allow a quicker reaction of the relay valve when the activation pressure is released.

Preferably, the method comprises a step of receiving a deceleration demand from a deceleration demand source, and a step of determining a target deceleration effect from the deceleration demand, wherein the target deceleration effect is the predetermined deceleration threshold. The deceleration demand source of the deceleration system may comprise or may be configured as a brake pedal operated by a driver. Alternatively, the deceleration demand source may comprise a brake valve that is controlled according to the operation of the brake pedal. That is, the deceleration demand is generated by a driver pressing the brake pedal. If the brake pedal is pressed more intensively, an increased brake demand is generated compared to a state with a less pressed brake pedal.

Preferably, the deceleration demand or the target deceleration effect from the deceleration demand source is used as a general target value for the whole deceleration system. That is, when the vehicle is decelerated solely by the second deceleration subsystem, the second deceleration subsystem is controlled to achieve a deceleration effect according to the target deceleration effect. However, when the second deceleration subsystem and the first deceleration subsystem, i.e. the pressure operated brake system, are activated simultaneously, both subsystems are controlled to achieve a deceleration effect according to the target deceleration effect.

Preferably, the deceleration demand from the deceleration demand source is an output pressure that is used as the activation pressure of the pressure operated brake system.

Preferably, the receiving of the deceleration demand comprises measuring and/or estimating an output pressure from the deceleration demand source. In a pressure operated brake system, this output pressure that may be output from a brake pedal or from a brake valve according to the operation of a brake pedal by the driver, may be used as an amount of brake demand. By measuring this output pressure, the amount of brake demand can be determined thereof. However, if there is no detection means like a pressure sensor in the pressure operated brake system to detect the output pressure, the output pressure may be estimated according to other parameters like the stroke of the brake pedal and the volume of supply lines. The estimating of the output pressure from the deceleration demand source may be carried out additionally to the measuring.

Preferably, the deceleration demand is calculated from the output pressure from the deceleration demand source as a vehicle brake force or brake torque according to the driver's input via the brake pedal.

In particular, ABS-based brake systems equipped with stability functions (as an embodiment of a pressure operated brake system), typically have two pressure sensors connected to the two outputs of the brake pedal or brake valve, one for a primary and a secondary circuit of the brake system.

Further preferably, a required brake torque is calculated, the second deceleration subsystem needs to generate or to achieve the vehicle brake force or brake torque.

Preferably, for a quicker achieving of the target deceleration effect, the activation pressure is not blocked and supplied to the brake system for activation before activating the second deceleration subsystem. This is preferably carried out, if the target deceleration effect exceeds the deceleration effect that can be reached by the second deceleration subsystem. Preferably, if it can be determined that the braking effect caused by the second deceleration subsystem would not be sufficient, blocking of the activation pressure is not carried out and the activation pressure is directly supplied to the pressure operated brake system for its activation. In this case, the pressure operated brake system may be operated in parallel to the second deceleration subsystem to realize a blending operation or the pressure operated brake system may be operated exclusively to decelerate the vehicle. The blocking of the activation pressure is waived when the second deceleration subsystem is not able to decelerate the vehicle sufficiently. For example, if the second deceleration subsystem may only generate a limited amount of brake force or brake torque that is not sufficient to achieve the predetermined deceleration threshold, the blocking of the activation pressure would only lead to a loss of time when generating the deceleration effect. If the second deceleration subsystem comprises the electric machine that cannot generate a sufficient brake torque generatively since the energy storage is full and cannot store any more electric energy, or since a higher brake torque applied by the electric machine to the driven axles of the vehicle would lead to an instable dynamic state of the vehicle, the pressure operated brake system is preferably activated immediately and blocking of the activation pressure is omitted. This leads to a quicker generation of the deceleration effect.

Preferably, after releasing and supplying the activation pressure to the brake system for activation, the brake system and the second deceleration subsystem are operated simultaneously. As mentioned above, both systems may be operated according to a blending mode to generate the target deceleration effect.

Preferably, the method comprises a further step of receiving a wheel speed signal from at least one wheel speed detection means of the vehicle. Typically, the vehicle comprises wheel speed detection means like speed sensors. Advantageously, the wheel speed is detected from an axle or wheel, the second deceleration subsystem is acting on. If the second deceleration subsystem comprises an electric machine, this may be one or more driven axles or wheels. Further preferably, the wheel speed is detected from an axle or wheel, the second deceleration subsystem is not acting on. Thereby, a comparison between axles or wheels the second deceleration subsystem is acting on and axles or wheels the second deceleration subsystem is not acting on may be realized.

Preferably, the current deceleration effect is determined from the wheel speed signal. This may be realized by the comparison between axles or wheels the second deceleration subsystem is acting on and axles or wheels the second deceleration subsystem is not acting on. If the current deceleration effect is not sufficient, the generated activation pressure may be released to activate the pressure operated brake system.

Preferably, the brake system is controlled according to the wheel speed signal and/or according to a wheel slip signal. The wheel slip signal is calculated from the detected wheel speed signals. In particular, a wheel slip may be generated by a comparison between axles or wheels the second deceleration subsystem is acting on and axles or wheels the second deceleration subsystem is not acting on or by comparing the respective wheel speed to a global vehicle speed which is the vehicle speed compared to the ground.

Preferably, the wheels slip of the wheels, the second deceleration subsystem acts on is calculated and a limit for a braking force or braking torque is determined according to the current slip of these wheels. This allows an evaluation of the current situation and of the possibility if the required deceleration effect can be achieved solely by the second deceleration subsystem. Preferably, the relationship between the wheel slip and the braking force or braking torque of the second deceleration subsystem may be predefined in a lookup table or controlled via a regulator such as a PID controller.

If the second deceleration subsystem comprises an electric machine, configured to act on some of the wheels of the vehicle to drive and decelerate the vehicle. A slip can be calculated between a comparison of wheel speeds of one or more wheels the electric machine acts on and one or more wheels the electric machine does not act on.

Preferably, a slip limit can be calculated, wherein the second deceleration subsystem is controlled in such way that the slip caused by the second deceleration subsystem stays lower than this slip limit. According to the slip limit, a brake torque or brake force limit may be calculated, the second deceleration subsystem may not exceed when it is activated.

Preferably, a target brake torque or target brake force may be calculated to achieve a deceleration effect according to the deceleration demand.

Preferably, the second deceleration subsystem is controlled in such way that it decelerates the vehicle with a maximum deceleration effect that is limited by the slip limit or by the brake torque or brake force limit.

If the deceleration of the vehicle according to the deceleration demand cannot be realized by the second deceleration subsystem, the activation pressure is released and the pneumatic operated brake system is activated.

Preferably, when the pressure operated brake system is activated, a pressure control, in particular an open loop pressure control, is used to control the brake pressure at all axles or wheels the pressure operated brake system acts on. Preferably, the control is based on the respective wheel slip or wheel speed. Preferably, pressure estimation is used to estimate the actual brake pressure in the wheel ends acting on the brake actuators and to compare the estimated brake pressure to a target value like the target brake torque or target brake force.

According to the invention, a deceleration system for a vehicle is provided. It is clear for a person skilled in the art that features of the deceleration system mentioned above at the description of the method also apply to the deceleration system described in the following.

The deceleration system comprising:
- a pressure operated brake system that is a first deceleration subsystem of the deceleration system;
- a second deceleration subsystem;
- a device for generating an activation pressure for activating the brake system; and
- a control unit configured to control the deceleration system according to the method as described above, wherein
- the deceleration system is configured for blocking the generated activation pressure to keep the brake system deactivated.

The control unit preferably comprises an electronic control device, such as a computer-based controller, configured to control the deceleration system accordingly.

Preferably, the deceleration system is configured to activate and/or control the pressure operated brake system by releasing the activation pressure at least partially.

Preferably, the brake system comprises a pressure control valve and the activation pressure is a brake pressure for activating a brake actuator of the brake system, wherein blocking/releasing of the activation pressure is realized by a pressure control valve configured to control a brake pressure supplied to the brake actuator or by a separate blocking valve of the brake system.

Alternatively, the brake system comprises a relay valve and the activation pressure is a control pressure for a relay valve of the brake system, wherein the relay valve is configured to supply a brake pressure to a brake actuator of the brake system according to the activation pressure, wherein blocking/releasing of the activation pressure is realized by the relay valve of the brake system or by a separate blocking valve of the brake system.

Preferably, the deceleration system comprises a deceleration demand source, in particular a brake pedal. The deceleration demand source may comprise or may be configured as a brake pedal operated by a driver. Alternatively, the deceleration demand source may comprise a brake valve that is controlled according to the operation of the brake pedal Preferably, the deceleration demand source is configured to supply an output pressure to the brake system, wherein the deceleration system is configured for measuring and/or estimating the output pressure from the deceleration demand source. For measuring the output pressure, the brake system comprises detection means, in particular a pressure sensor.

Preferably, the second deceleration subsystem comprises an electric machine and/or an endurance brake, in particular a retarder Preferably, the deceleration system comprises wheel speed detection means for detecting at least one wheel speed.

Preferably, the deceleration system comprises a reservoir for compressed air for supplying pressure to the pressure operated brake system, wherein the pressurized air reservoir comprises at least two independent air reservoirs.

Preferably, the deceleration system comprises a brake demand source with at least two brake valves configured to supply an output pressure according to a driver input via a brake pedal.

Preferably, the deceleration system comprises at least two independent circuits formed by the respective independent air reservoirs, the respective brake valves and respective valves for activating respective brake actuators. In particular, one circuit is allocated to a first axle (e.g. a front axle) of the vehicle and one circuit is allocated to a second axle (e.g. a rear axle) of the vehicle.

According to one preferred aspect of the invention, a deceleration system is provided with a pneumatic operated brake system as a first deceleration subsystem and an electric machine as a second deceleration subsystem. The deceleration system further comprises a brake valve configured to supply an output pressure as activation pressure to the pneumatic operated brake system according to a driver input from a brake pedal. The pneumatic operated brake system is further configured to block the activation pressure to keep the pneumatic operated brake system inactive, i.e. the pneumatic operated brake system does not apply a deceleration effect to the vehicle. Instead, the deceleration of the vehicle is monitored by a control unit of the deceleration system, wherein in this operating state, wherein the activation pressure is blocked, a deceleration effect is applied solely to the vehicle by the second deceleration subsystem. The monitoring of the deceleration of the vehicle is preferably realized by monitoring the wheel speed or wheel slip or by monitoring a deceleration signal from a deceleration detection unit. The activation pressure is released for activation the pneumatic operated brake system, if the deceleration effect achieved by the second deceleration subsystem is not sufficient in the current braking situation. When the activation pressure is released a blending operation between the pneumatic operated brake system and the second deceleration subsystem is realized, wherein a brake pressure supplied to brake actuators of the pneumatic operated brake system is controlled by the control unit according to the wheel speed or according to the wheel slip of the respective wheel or axle of the vehicle.

According to the invention, a vehicle comprising a deceleration system as described above is provided. The vehicle may be configured as an electric or hybrid vehicle comprising an electric machine which is part of or may be the second deceleration subsystem. The vehicle is preferably configured as a commercial vehicle.

In the following, the invention is described more in detail by using the attached drawings.

DETAILED DESCRIPTION OF THE DRAWINGS

Figure 1:
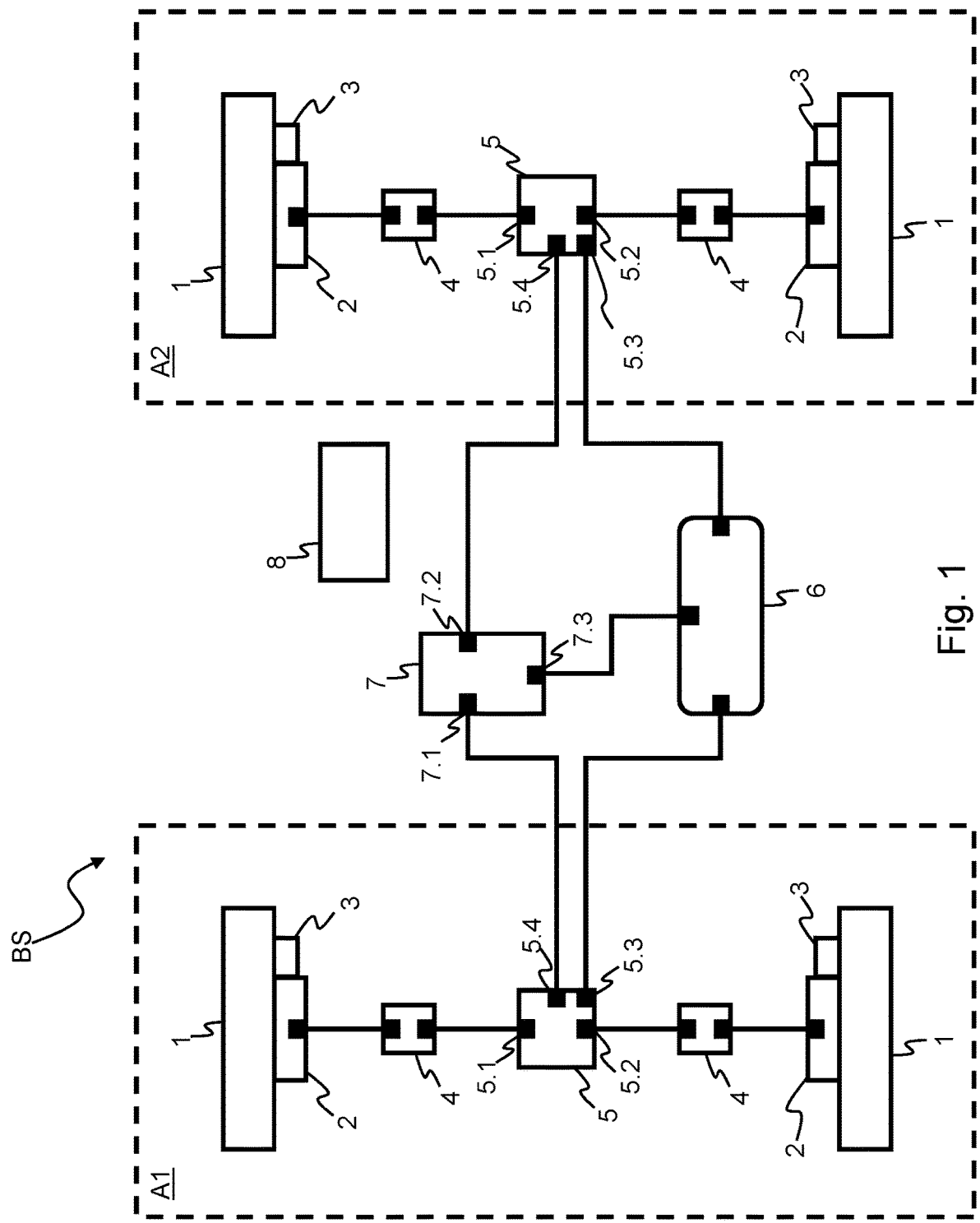
FIG. 1 shows a configuration of a pressure operated brake system.

FIG. 1 shows a configuration of a pressure operated brake system BS. The pressure operated brake system BS is part of a deceleration system. The brake system BS is a first deceleration subsystem of the deceleration system. This brake system BS is provided on a vehicle, in particular on a commercial vehicle. The vehicle comprises two axles A1, A2 marked up by the dashed frames. Each axle A1, A2 comprises wheels 1, wherein for applying a deceleration effect to the vehicle, the brake system BS comprises brake actuators 2 allocated to each wheel 1. The brake actuators 2 are configured as friction brake actuators, for example disc or drum brakes. For simplification, further parts of the vehicle are not shown. Further to each wheel 1, a wheel speed detection unit 3, such as a wheel speed sensor, is allocated for detection of the respective wheel speed.

The brake system BS is pressure operated and, in this particular embodiment, configured as a pneumatic brake system. Therefore, a pressurized air reservoir 6 is provided to supply pressure to the brake system BS.

The brake system BS comprises a brake demand source 7. The brake demand source 7 is configured to supply an output pressure via its output ports 7.1, 7.2 to the axles A1, A2, wherein pressurized air from the air reservoir 6 is supplied to an input port 7.3 of the brake demand source 7. According to a driver input, in particular by a brake pedal, the brake demand source 7 supplies an output pressure as a control pressure via its output ports 7.1, 7.2 to the axles A1, A2.

At each axle A1, A2, a relay valve 5 is provided. The relay valve 5 comprises two output ports 5.1, 5.2 connected to the brake actuators 2 via a pressure control valve 4 (PCV), respectively. Pressurized air from the air reservoir 6 is supplied to an input port 5.3 of the relay valve 5. Further, a control port 5.4 of the relay valve 5 of axle A1 is connected to the output port 7.1 of the brake demand source 7 and a control port 5.4 of the relay valve 5 of axle A2 is connected to the output port 7.2 of the brake demand source 7. The relay valve 5 is configured to generate a brake pressure which may be supplied from the output ports 5.1, 5.2 via the respective PCV 4 to the brake actuators 2, respectively. This brake pressure activates the brake actuators 2 for applying a deceleration effect to the vehicle.

Each PCV 4 is configured to control the brake pressure supplied from the respective relay valve 5 to the brake actuator 2. Therefore, each PCV 4 is configured to enable the connection between the relay valve 5 and the respective brake actuator 2 according to a first switching state, to hold the brake pressure in the brake actuator 2 according to a second switching state, and to release the brake pressure according to a third switching state.

Further, the brake system BS comprises a control unit 8. The control unit 8 comprises an electronic control device configured to control the brake system BS. The control unit 8 is connected to the wheel speed detection units 3, wherein wheel speed signals of the respective wheels 1 are provided to the control unit 8. The control unit 8 is further configured to control each PCV 4. For simplification, the electronic connections between the control unit 8 and the PCVs 4 and between the control unit 8 and the wheel speed detection units 3 are not shown in the drawing.

In the embodiment shown in the drawing, an activation pressure is generated by the relay valves 5 according to the output pressure of the brake demand source 7 which is supplied to the input ports 5.3 of the respective relay valves 5. Blocking of the activation pressure is realized in this embodiment by each PCV 4. That is, here, according to a control signal of the control unit 8 supplied to each PCV 4, the PCVs 4 block the connection between the relay valves 5 and the respective brake actuator 2. In this state, the brake actuators 2 cannot be activated since brake pressure cannot be supplied from the relay valves 5 to the brake actuators 2. In this state, a deceleration effect to the vehicle is applied by a second deceleration subsystem (not shown), wherein the control unit 8 monitors the brake effect of the vehicle. This is realized by analyzing the wheel speed signals.

If the brake effect caused by the second deceleration subsystem is not sufficient, the control unit 8 releases the brake pressure generated by the relay valves 5 by respectively controlling the PCVs 4, whereby the PCVs 4 establish the connection between the relay valves 5 and the brake actuators 2. In this state, the second deceleration subsystem and the pressure operated brake system BS are operated in parallel according to a blending operation. The brake pressure supplied to the brake actuators 2 is controlled by the PCVs 4 according to the wheel speed signals from the wheel speed detection units 3.

Figure 2:
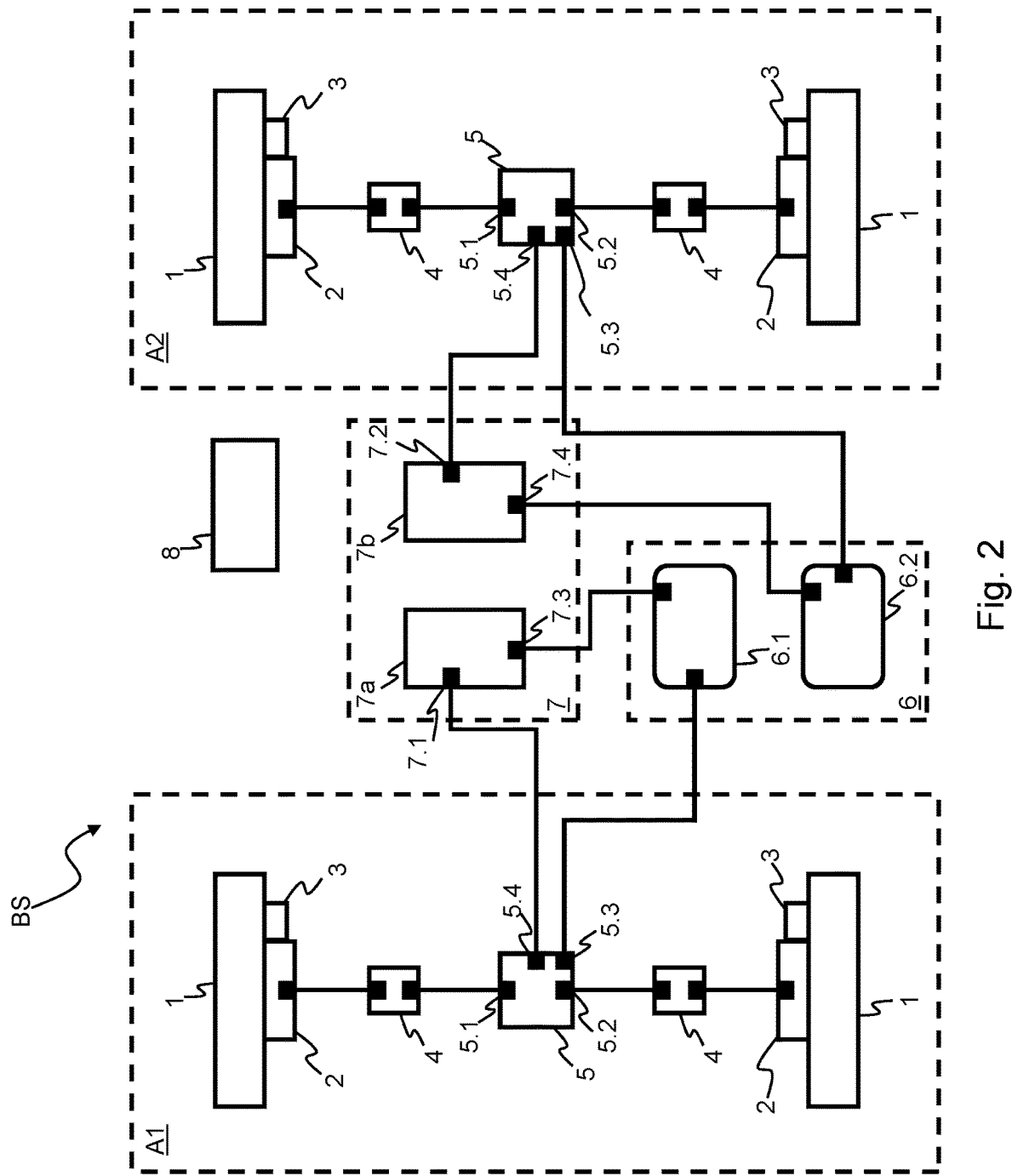
FIG. 2 shows a second embodiment of a pressure operated brake system.

FIG. 2 shows a second configuration of a pressure operated brake system.

A pressure operated brake system BS is shown, which is part of a deceleration system. The deceleration system further comprises a second deceleration subsystem (not shown). The brake system BS is a first deceleration subsystem of the deceleration system. This brake system BS is provided on a vehicle, in particular on a commercial vehicle. The vehicle comprises two axles A1, A2 marked up by the dashed frames. Each axles A1, A2 comprise wheels 1, wherein for applying a deceleration effect to the vehicle, the brake system BS comprises brake actuators 2 allocated to each wheel 1. The brake actuators 2 are configured as friction brake actuators, for example disc or drum brakes. For simplification, further parts of the vehicle are not shown. Further to each wheel 1, a wheel speed detection unit 3, such as a wheel speed sensor, is allocated for detection of the respective wheel speed.

The brake system BS is pressure operated and in this particular embodiment configured as a pneumatic brake system. Therefore, a pressurized air reservoir 6 is provided to supply pressure to the brake system BS. According to this embodiment, the pressurized air reservoir 6 comprises a first reservoir 6.1 and a second reservoir 6.2.

The brake system BS comprises a brake demand source 7. The brake demand source 7 is configured to supply an output pressure via its output ports 7.1, 7.2 to the axles A1, A2, wherein pressurized air from the air reservoir 6 is supplied to the brake demand source 7. The brake demand source 7 comprises two brake valves 7a, 7b. The first brake valve 7a is connected to the first reservoir 6.1 via its input port 7.3 whereby compressed air is supplied to the first brake valve 7a. The second brake valve 7b is connected to the second reservoir 6.2 via its input port 7.4 whereby compressed air is supplied to the second brake valve 7b. The brake valve 7a is configured to supply an output pressure to the axle A1 via its output port 7.1. The brake valve 7b is configured to supply an output pressure to the axle A2 via its output port 7.2. The output pressure supplied by the brake valves 7a, 7b is generated from the pressure supplied to the brake valves 7a, 7b via the input ports 7.3, 7.4. According to a driver input in particular by a brake pedal, the brake demand source 7 supplies the output pressure as a control pressure via its output ports 7.1, 7.2 to the axles A1, A2.

At each axle A1, A2, a relay valve 5 is provided. The relay valve 5 comprises two output ports 5.1, 5.2 connected to the brake actuators 2 via a pressure control valve 4 (PCV), respectively. Pressurized air from the air reservoir 6 is supplied to an input port 5.3 of the relay valve 5. Here, the first reservoir 6.1 is connected to the input port 5.3 of the relay valve 5 of the axle A1 and the second reservoir 6.2 is connected to the input port 5.3 of the relay valve 5 of the axle A2. Further, a control port 5.4 of the relay valve 5 of axle A1 is connected to the output port 7.1 of the brake valve 7a and a control port 5.4 of the relay valve 5 of axle A2 is connected to the output port 7.2 of the brake valve 7b. The relay valve 5 is configured to generate a brake pressure which may be supplied from the output ports 5.1, 5.2 via the respective PCV 4 to the brake actuators 2, respectively. This brake pressure activates the brake actuators 2 for applying a deceleration effect to the vehicle.

Each PCV 4 is configured to control the brake pressure supplied from the respective relay valve 5 to the brake actuator 2. Therefore, each PCV 4 is configured to enable the connection between the relay valve 5 and the respective brake actuator 2 according to a first switching state, to hold the brake pressure in the brake actuator 2 according to a second switching state, and to release the brake pressure according to a third switching state.

Further, the brake system BS comprises a control unit 8. The control unit 8 comprises an electronic control device configured to control the brake system BS. The control unit 8 is connected to the wheel speed detection units 3, wherein wheel speed signals of the respective wheels 1 are provided to the control unit 8. The control unit 8 is further configured to control each PCV 4. For simplification, the electronic connections between the control unit 8 and the PCVs 4 and between the control unit 8 and the wheel speed detection units 3 are not shown in the drawing.

In the embodiment shown in the drawing, an activation pressure is generated by the relay valves 5 according to the output pressure of the brake demand source 7 which is supplied to the input ports 5.3 of the respective relay valves 5. Blocking of the activation pressure is realized in this embodiment by each PCV 4. That is, here, according to a control signal of the control unit 8 supplied to each PCV 4, the PCVs 4 block the connection between the relay valves 5 and the respective brake actuator 2. In this state, the brake actuators 2 cannot be activated since brake pressure cannot be supplied from the relay valves 5 to the brake actuators 2. In this state, a deceleration effect to the vehicle is applied by a second deceleration subsystem (not shown), wherein the control unit 8 monitors the brake effect of the vehicle. This is realized by analyzing the wheel speed signals.

If the brake effect caused by the second deceleration subsystem is not sufficient, the control unit 8 releases the brake pressure generated by the relay valves 5 by respectively controlling the PCVs 4, whereby the PCVs 4 establish the connection between the relay valves 5 and the brake actuators 2. In this state, the second deceleration subsystem and the pressure operated brake system BS are operated in parallel according to a blending operation. The brake pressure supplied to the brake actuators 2 is controlled by the PCVs 4 according to the wheel speed signals from the wheel speed detection means 3.

The configuration shown in this figure comprises two separate circuits which are independent from each other. The first circuit is formed by the first reservoir 6.1 and the brake valve 7a and the valves 4, 5 allocated to axle A1. The second circuit is formed by the second reservoir 6.2 and the brake valve 7b and the valves 4, 5 allocated to axle A2. In particular, the pressure operated brake system shown may be configured as a pneumatic operated brake system for a commercial vehicle.

Figure 3:
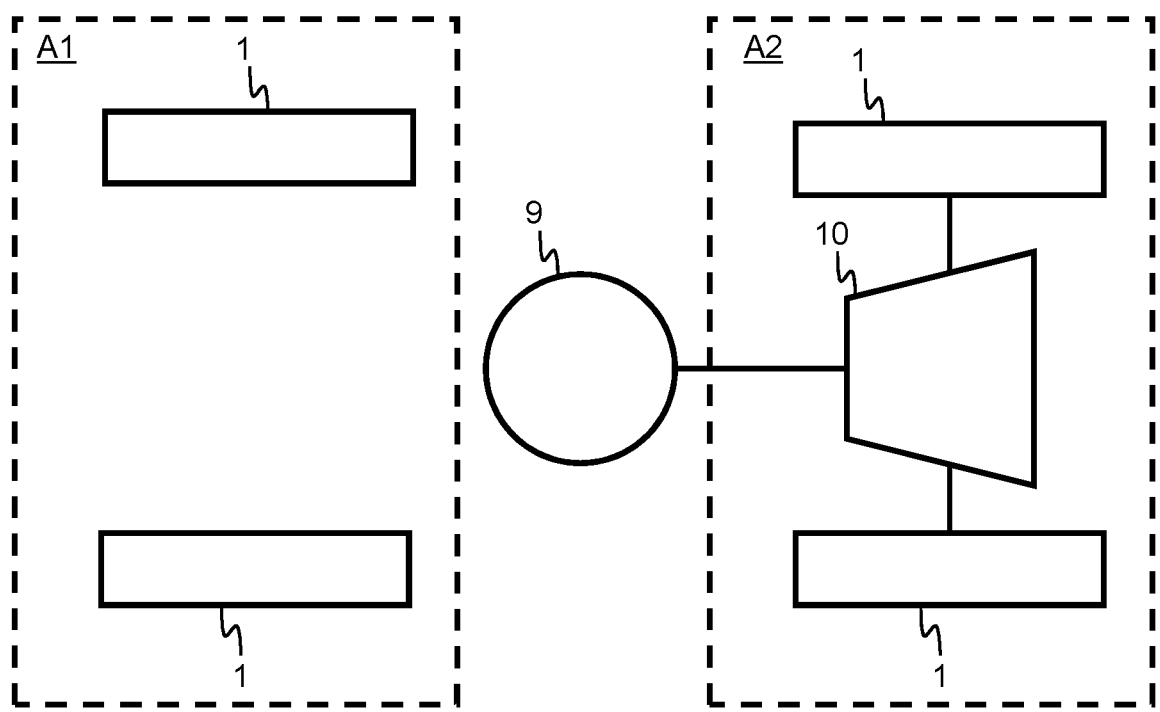
FIG. 3 shows an embodiment of a second deceleration subsystem.

FIG. 3 shows an embodiment of a second deceleration subsystem.

In the drawing, the axles A1, A2 with the respective wheels 1 are shown. Other parts of the vehicle or of the pressure operated brake system BS are not shown for simplification.

Here, the second deceleration subsystem comprises an electric machine 9 configured for propulsion of the wheels 1 of axle A2, wherein a torque is transferred to these wheels 1 via a differential gearbox 10.

For deceleration, the electric machine 9 is operated as a generator, wherein a braking torque is generated by the electric machine 9 and transferred to the wheels 1 of axle A2.

As there is only one axle propelled or braked by the electric machine 9, the deceleration effect caused by the electric machine 9 might be limited since the wheels 1 of axle A2 can only support a certain amount of braking force on the road. Further, if the electric energy generated by the electric machine 9 during deceleration cannot be stored in a electric storage (not shown) since this storage is full, the pressure operated brake system BS shown in FIG. 1 must be activated, by releasing the activation pressure as described above. Then, both deceleration subsystems, in particular the pressure operated brake system BS shown in FIG. 1 and the electric machine 9 shown in FIG. 2 apply a deceleration effect to the vehicle in a blending operation.

Figure 4:
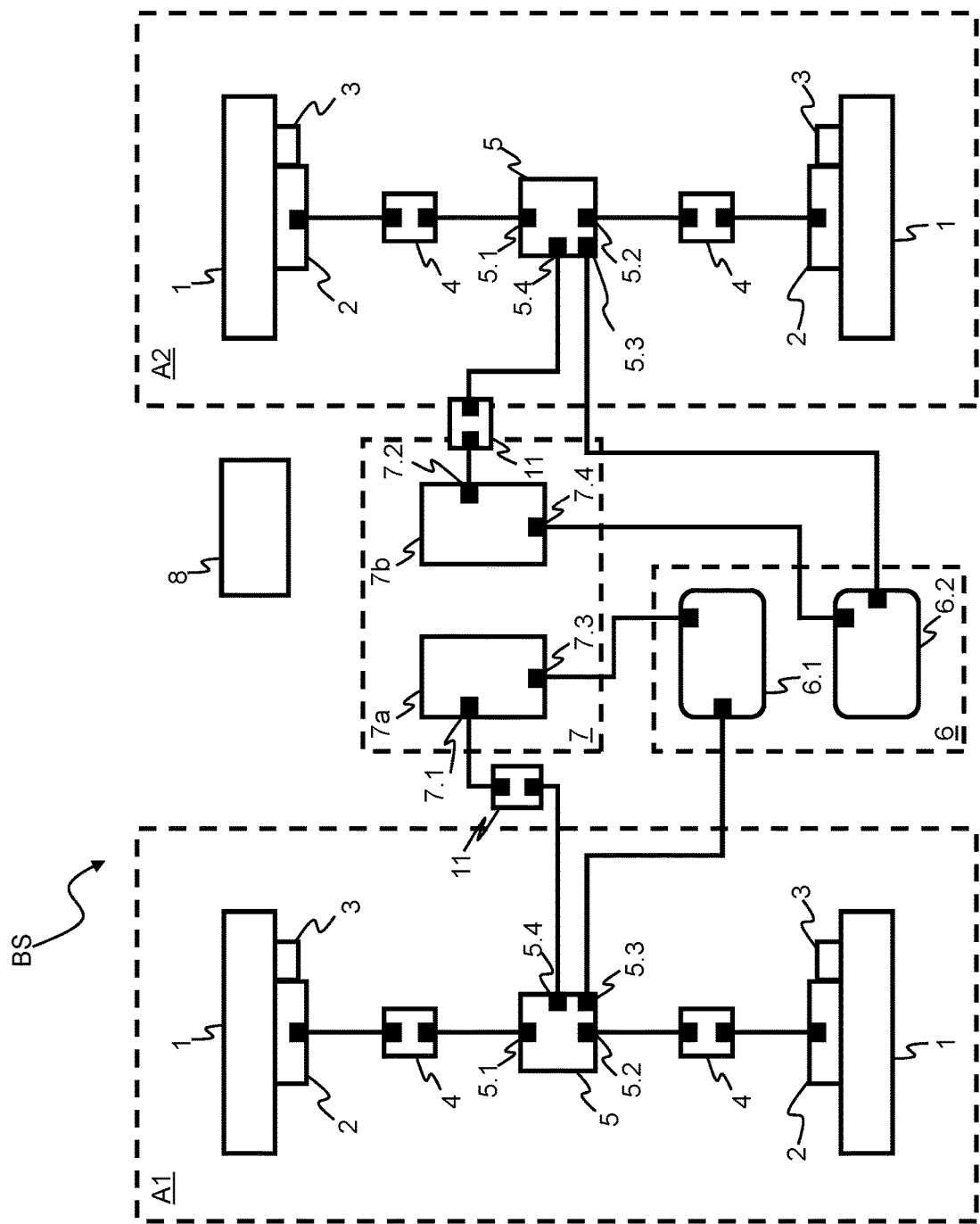
FIG. 4 shows an embodiment of the configuration shown in FIG. 2.

FIG. 4 shows an embodiment of the configuration shown in FIG. 2. Since the embodiment is similar to the embodiment shown in FIG. 2, only the differences are described in the following.

Here, for blocking the activation pressure, a blocking valve 11 is provided between the output ports 7.1, 7.2 of the brake valves 7a, 7b of the brake demand source 7 and the respective input port 5.3 of the relay valves 5 of axles A1, A2. In this embodiment, the activation pressure is not the brake pressure supplied to the brake actuators 2. Instead, the activation pressure is the output pressure from the brake demand source 7 which acts as a respective control pressure for the relay valves 5.

The blocking valve 11 is configured to establish and to block the connection between the output ports 7.1, 7.2 of the brake demand source 7 and the respective input port 5.3 of the relay valves 5. The blocking valve 11 is further controlled by the control unit 8.

Figure 5:
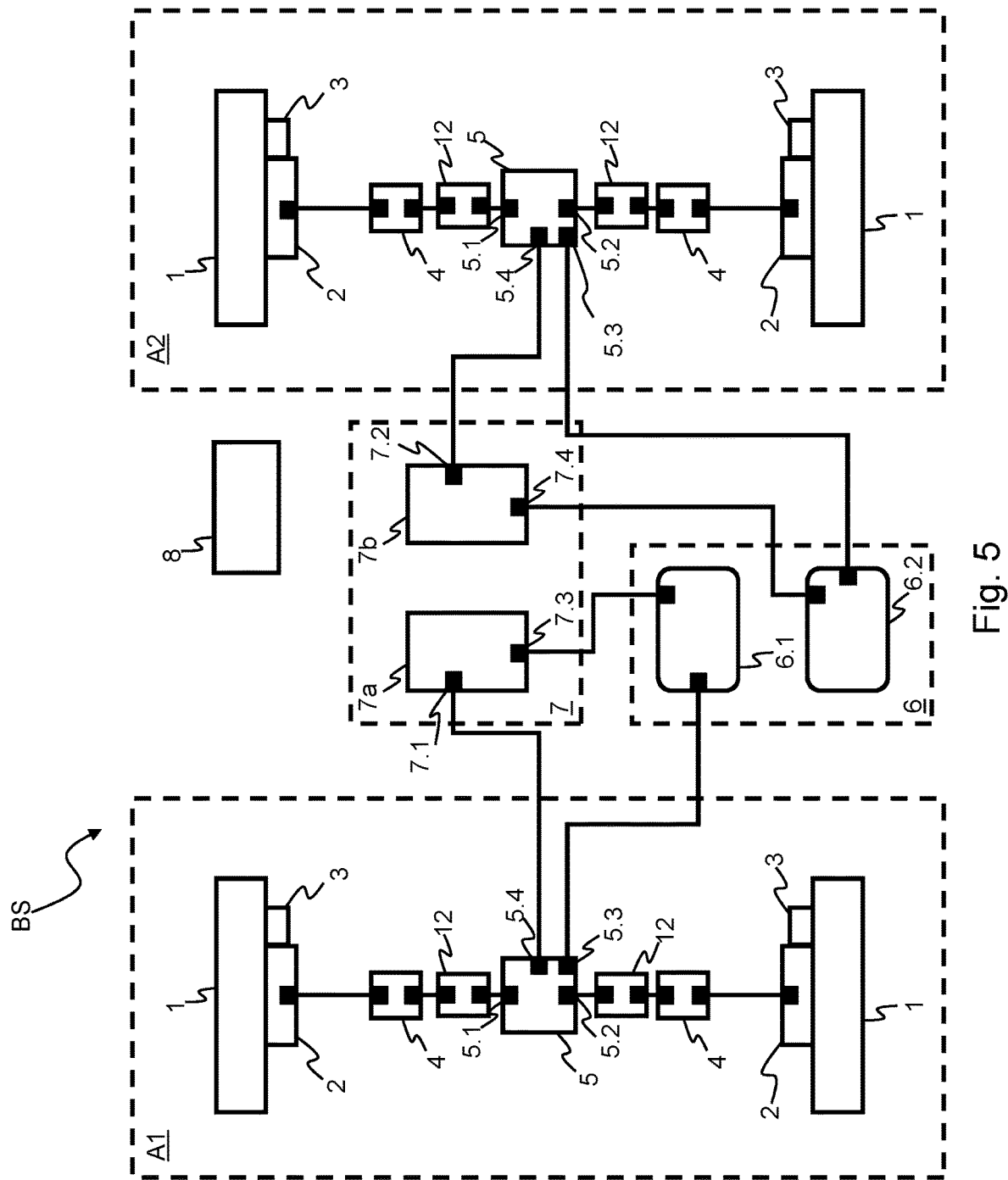
FIG. 5 shows a further embodiment of the configuration shown in FIG. 2.

FIG. 5 shows a further embodiment of the configuration shown in FIG. 2. Since the embodiment is similar to the embodiment shown in FIG. 2, only the differences are described in the following.

Here, for blocking the activation pressure, blocking valves 12 are provided between the output ports 5.1, 5.2 of the relay valve 5 and the respective PCV 4. In this embodiment, the activation pressure is the brake pressure supplied to the brake actuators 2.

The blocking valve 12 is configured to establish and to block the connection between the output ports 5.1, 5.2 of the relay valve 5 and the respective PCV 4. The blocking valve 12 is further controlled by the control unit 8.

In the figures, two axles A1, A2 are shown. However, this is not meant to limit the invention. Other embodiments are contemplated comprising more than two axles. Further, in the embodiments shown in the figures, axle A1 may be a front axle of the vehicle, wherein axle A2 may be a rear axle of the vehicle. However, other embodiments are conceivable, wherein axle A1 is the rear axle and axle A2 is the front axle. Further, other embodiments are conceivable, wherein axle A1 and/or axle A2 comprise more than one axle. Typically, a commercial vehicle may comprise axle A1 as front axle and axle A2 comprising two separate axles as rear axle.

LIST OF REFERENCE SIGNS 1 wheel
2 brake actuator
3 wheel speed detection unit
4 pressure control valve (PCV)
5 relay valve
5.1 output port
5.2 output port
5.3 input port
5.4 control port
6 pressurized air reservoir
6.1 first reservoir
6.2 second reservoir
7 brake demand source
7a brake valve
7b brake valve
7.1 output port
7.2 output port
7.3 input port
7.4 input port
8 control unit
9 electric machine
10 differential gearbox
11 blocking valve
12 blocking valve
A1 axle
A2 axle
BS pressure operated brake system

What is claimed is:

1. A method for controlling a deceleration system of a vehicle, wherein the deceleration system comprises a pressure operated brake system that is a first deceleration subsystem of the deceleration system,
the method comprising the steps of:
activating a second deceleration subsystem of the deceleration system for applying a current deceleration effect to the vehicle;
generating an activation pressure for activating the pressure operated brake system;
blocking the generated activation pressure to keep the pressure operated brake system deactivated such that the activation pressure being generated does not apply a deceleration effect to the vehicle;
monitoring the deceleration of the vehicle with a control unit of the deceleration system, wherein while the activation pressure is blocked a deceleration effect is applied to the vehicle solely by the second deceleration subsystem; and
releasing the blocked, generated activation pressure and supplying the generated activation pressure to the pressure operated brake system for activation when the current deceleration effect applied to the vehicle by the second deceleration subsystem is lower than a predetermined deceleration threshold.

2. The method according to claim 1,
wherein the activation pressure is a control pressure for a relay valve of the brake system, wherein the relay valve is configured to supply a brake pressure to a brake actuator of the brake system according to the activation pressure, wherein blocking of the activation pressure is realized by the relay valve of the brake system or by a separate blocking valve, or
wherein the activation pressure is a brake pressure for activating a brake actuator of the brake system, wherein blocking of the activation pressure is realized by a pressure control valve configured to control a brake pressure supplied to the brake actuator or by a separate blocking valve.

3. The method according to claim 1, further comprising the steps of:
receiving a deceleration demand from a deceleration demand source; and
determining a target deceleration effect from the deceleration demand, wherein the target deceleration effect is the predetermined deceleration threshold.

4. The method according to claim 3, wherein
the receiving of the deceleration demand comprises measuring and/or estimating an output pressure from the deceleration demand source.

5. The method according to claim 3, wherein
the activation pressure is not blocked and supplied to the brake system for activation before activating the second deceleration subsystem, when the target deceleration effect exceeds the deceleration effect that can be reached by the second deceleration subsystem.

6. The method according to claim 1, wherein
after releasing and supplying the generated activation pressure to the brake system for activation, the brake system and the second deceleration subsystem are operated simultaneously.

7. The method according to claim 1, further comprising the step of:
receiving a wheel speed signal from at least one wheel speed detection unit of the vehicle.

8. The method according to claim 7, wherein
the current deceleration effect is determined from the wheel speed signal.

9. The method according to claim 7, wherein
the brake system is controlled according to the wheel speed signal and/or according to a wheel slip signal.

10. A deceleration system for a vehicle, comprising:
a pressure operated brake system that is a first deceleration subsystem of the deceleration system;
a second deceleration subsystem;
a device for generating an activation pressure for activating the pressure operated brake system; and
a control unit configured to control the deceleration system, by:
activating the second deceleration subsystem of the deceleration system for applying a current deceleration effect to the vehicle;
generating an activation pressure for activating the pressure operated brake system;
blocking the generated activation pressure to keep the pressure operated brake system deactivated such that the activation pressure being generated does not apply a deceleration effect to the vehicle;
monitoring the deceleration of the vehicle, wherein while the activation pressure is blocked a deceleration effect is applied to the vehicle solely by the second deceleration subsystem; and
releasing the blocked, generated activation pressure and supplying the generated activation pressure to the pressure operated brake system for activation when the current deceleration effect applied to the vehicle by the second deceleration subsystem is lower than a predetermined deceleration threshold.

11. The deceleration system according to claim 10,
wherein the pressure operated brake system comprises a relay valve and the activation pressure is a control pressure for the relay valve of the brake system, wherein the relay valve is configured to supply a brake pressure to a brake actuator of the brake system according to the activation pressure, wherein blocking of the activation pressure is realized by the relay valve of the brake system or by a separate blocking valve, or wherein the brake system comprises a pressure control valve and the activation pressure is a brake pressure for activating a brake actuator of the brake system, wherein
blocking of the activation pressure is realized by the pressure control valve configured to control a brake pressure supplied to the brake actuator or by a separate blocking valve.

12. The deceleration system according to claim 10, wherein
the deceleration system comprises a deceleration demand source.

13. The deceleration system according to claim 12, wherein
the deceleration demand source is a brake pedal.

14. The deceleration system according to claim 12, wherein
the deceleration demand source is configured to supply an output pressure to the brake system,
the deceleration system is configured for measuring and/or estimating the output pressure from the deceleration demand source.

15. The deceleration system according to claim 10, wherein
the second deceleration subsystem comprises an electric machine and/or an endurance brake, and wherein the deceleration system further comprises a wheel speed detection unit for detecting at least one wheel speed.

16. A vehicle comprising a deceleration system according to claim 10.

* * * * *